C. B. HOWARD.
STEAM TRAP.
APPLICATION FILED FEB. 3, 1914.
1,132,184.
Patented Mar. 16, 1915.
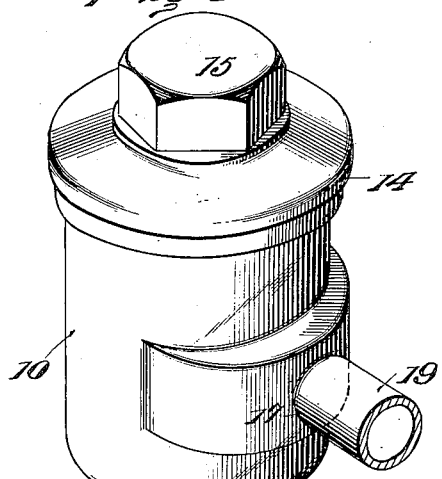
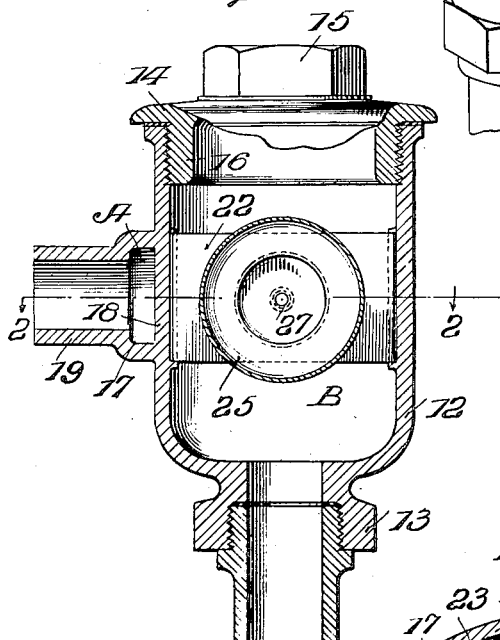
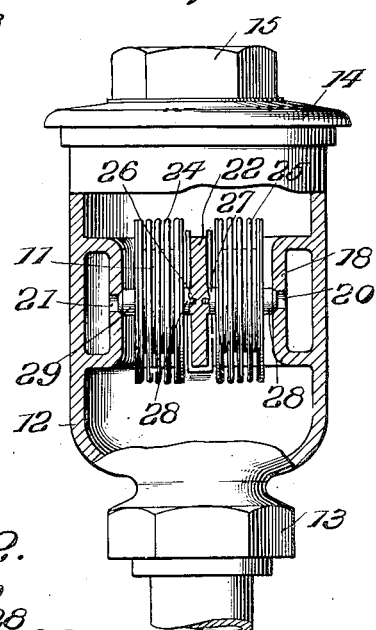
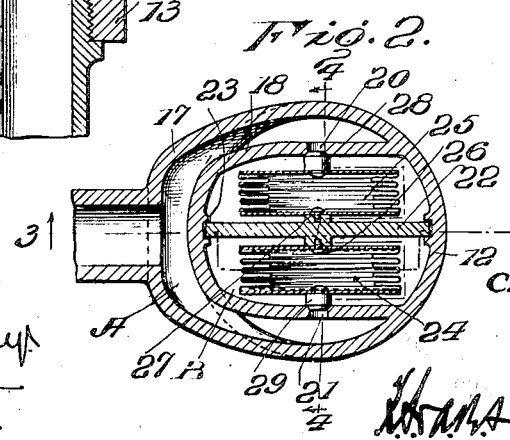
Inventor
Charles B. Howard.
Witnesses
Attorneys.

UNITED STATES PATENT OFFICE.

CHARLES B. HOWARD, OF BROCKTON, MASSACHUSETTS.

STEAM-TRAP.

1,132,184. Specification of Letters Patent. Patented Mar. 16, 1915.

Application filed February 3, 1914. Serial No. 816,248.

*To all whom it may concern:*

Be it known that I, CHARLES B. HOWARD, citizen of the United States, residing at Brockton, in the county of Plymouth and State of Massachusetts, have invented certain new and useful Improvements in Steam-Traps, of which the following is a specification.

The present invention relates to new and useful improvements in steam traps, and has particular reference to that class of steam traps wherein thermostatic valves are employed to close the steam inlets at the moment the water of condensation has been completely drained from the steam and the steam begins to enter the trap.

As its principal object, this invention aims to provide a trap equipped with a multiple thermostatic valve designed in such manner that the various elements of the valve will move successively into closed position, so that the complete draining of the water of condensation is assured by permitting the incoming steam to act on the small particles of water before the steam inlet ports are completely closed.

An object of equal importance with the foregoing is to construct the thermostatic valve as a unitary device, and to removably mount it in the main body casing of the trap so that in case of breakage or disarrangement of any of the valve elements, the entire device may be removed from the body casing as a unit.

A still further object is to construct the steam trap of this invention with such regard to number, proportion and arrangement of parts that it may be cheaply manufactured, will be durable and efficient in its operation, and may be readily applied to any steam heating system with a minimum amount of adjustment of parts.

The above and additional objects are accomplished by such means as are illustrated in the accompanying drawings, described in the following specification, and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is an exterior perspective view of the steam trap; Fig. 2 is a horizontal section illustrating the various valve elements in assembled relation within the body casing of the trap; Fig. 3 is a section on the line 3—3 of Fig. 2; and Fig. 4 is a section on the line 4—4 of Fig. 3.

Proceeding now to the description of the drawings: The preferred embodiment of this invention includes two main elements, a body casing and a thermostatic valve, respectively designated as entireties by the numerals 10 and 11. The body casing 10 is for the most part of the usual construction and includes a metallic substantially cylindrical casing 12 formed at its lower terminal with an internally screw-threaded nipple 13 and equipped at its upper terminal with a removable closure cap 14. This cap 14 is of the usual type, being provided with a nut 15 and an exteriorly screw-threaded dependent annular flange 16 designed for screw-threaded application to the upper end of the member 12.

Two independent chambers are formed in the body casing 10 by the provision of a pair of substantially U-shaped concentrically spaced walls 17 and 18 which are in practice preferably formed integrally with the member 12. An inlet pipe 19 communicates with the inlet chamber formed between the two walls 17 and 18, which will be hereinafter designated by the letter A.

By reference particularly to Figs. 2 and 4, it will be observed that the steam or water of condensation, as the case may be, enters the chamber A from the pipe 19 and passes to the outlet chamber, to be hereinafter designated by the letter B, through a pair of alined apertures or ports 20 and 21 formed in the opposite sides of the inner U-shaped wall 18.

Within the chamber B is removably mounted the valve 11, which is of the duplex type, and is carried by a removable partition plate 22. The plate 22 may be held in fixed position centrally of the chamber B through the medium of the pairs of vertically arranged spaced ribs which, as indicated at 23, are preferably formed integrally with the bight portion of the member 18 and the member 12. On each side of the partition plate 22, and approximately centrally thereof, is secured an expansible valve body, as indicated at 24 and 25. These valve bodies 24 and 25 are constructed of brass or any other durable and efficient sheet metal which may be found desirable, and are formed in the nature of collapsible accordion vessels or bellows. Bolts, screws, rivets, or any other suitable fastening devices may, as indicated at 26, be employed in securing the members 24 and 25 to the partition plate 22. It has been found expedient to interpose a pair of spacing buttons or washers 27 between the members 24 and 25 and the partition plate 22, so that a maximum expansion of the valve bodies may be had when the temperature within the chamber B is increased upon the entrance of the water of condensation and steam.

In order to obtain an effective expansion of the valve bodies so that the valve heads 28 and 29 carried respectively by the members 24 and 25 will move into sealing position in the openings 20 and 21, the members 24 and 25 are in practice partially filled with some liquid which will vaporize at a temperature approximately equal to three hundred degrees (300°) Fahrenheit, the normal temperature of a hundred pound steam system. In this connection, it has been found practical to employ a mixture of a heavy paraffin oil and ether, since a mixture of this type is characterized by what is known as "flash vaporization." It has also been found that the effectiveness of this steam trap in draining off the water of condensation by this system is greatly improved by varying the proportion of the ingredients of the mixtures in the valve bodies 24 and 25, so that one valve will move into closed position slightly ahead of the other. It is, of course, apparent that by closing one of the openings which effects communication between the chambers A and B slightly before the movement of the valve of the second opening in closed position, the incoming steam will act to drive all remaining particles of water of condensation from the inlet chamber A into the outlet chamber B.

While the preferred embodiment of this invention comprehends the accomplishment of the successive closing of the inlet ports 20 and 21 by filling the valve bodies 24 and 25 with mixtures of different temperatures of ebullition, it is, nevertheless, desirable to emphasize the fact that this invention also anticipates the performance of the same function by arranging the partition plate 22 more nearly adjacent one side of the member 18 than the other, or by varying the longitudinal dimensions of the valve heads, valve bodies or spacing members 27. Relative to the variations to which the several structural details of this invention may be subjected, it is to be observed that the conformation of the valve bodies 24 and 25 may be changed from the present disk shape to an oblong, a prolate or any other desired design.

Relative to the many advantages accruing from the novel form of structure employed in the present invention, it is to be noted that the number of parts employed is reduced to a minimum, that the separate elements are simple to an extreme as regards their design, and that the entire valve structure is assembled as a unitary device, so that in case of disarrangement or breakage of any of the valve elements, repairs may be quickly effected or a new valve element substituted by merely removing the closure cap 14 and withdrawing the plate 22.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What I claim is:—

1. A steam trap including a body casing, and a multiple thermostatic valve removably mounted therein, the valve including a plurality of thermally expansible body members, and a valve head carried by each of said body members, the separate elements of said valve being connected to form a unitary structure whereby they may be applied to or removed from the casing as a unit.

2. A steam trap including a body casing, a centrally arranged, substantially U-shaped partition dividing said body casing into independent chambers, one of which constitutes the inlet and the other constitutes the outlet for the steam, there being ports effecting communication between the chambers, and a thermostatic valve arranged in one of the chambers and adapted to seal the communicating ports between the two chambers in accordance with pre-determined variations in temperature in the chamber within which the valve is arranged.

3. A steam trap including a body casing, a partition dividing said body casing into independent chambers, one of said chambers constituting an inlet and the other of said chambers constituting an outlet for the steam, there being a plurality of ports effecting communication between the chambers, and a multiple thermostatic valve arranged in one of the chambers, said valve including a plurality of thermally expansible body members connected to form a unitary structure and adapted to expand and contract independently of each other in response to different temperatures, and a valve head carried by each of said body members, each of said valve heads being seatable in one of said ports.

4. A steam trap including a body casing, partitions dividing said casing into independent chambers, there being ports effecting communication between the chambers, a thermostatic valve arranged in one of the chambers and adapted to seal the ports between the chambers in response to pre-determined variations in temperature in the casing, said valve including a plurality of independent thermally expansible elements, each containing a substance having a relatively high ebullitional co-efficient, the substances contained within the different elements being of different ebullitional co-efficients whereby the elements will expand or contract independently of each other to successively seal the ports between the chambers.

5. A steam trap including a body casing, and a multiple thermostatic valve removably mounted therein, said valve including a removable supporting plate, a plurality of expansible body members secured thereto, said body members having different ebullitional co-efficients whereby they may respond independently of each other to different temperatures, and valve heads carried by said body members.

6. A steam trap including a body casing, partitions dividing said casing into independent chambers, and a thermostatic valve removably mounted in one of said chambers, said valve including a removable supporting plate, a plurality of expansible body members, and valve heads carried thereby, said valve body members being hollow and adapted to receive liquids of varied ebullitional temperatures.

7. A steam trap including a body casing, partitions dividing said body casing into an inlet and an outlet chamber, a multiple thermostatic valve arranged in said outlet chamber, the sealing elements in said valve being adapted to move successively into closed position for sealing the communicating ports between the two chambers in accordance with predetermined variations in temperature in the said body casing.

8. A steam trap including a body casing, U-shaped partitions formed integrally therewith and defining a substantially U-shaped inlet chamber, the body casing forming an outlet chamber, spaced parallel vertically extending lugs formed on the inner face of the body member and spaced parallel vertically extending ribs formed in the bight portion of the inner U-shaped partition wall and at a point opposed to the first-mentioned ribs, and a thermostatic valve mounted in the outlet chamber, said valve including a body plate adapted to be inserted in the outlet chamber and held in position therein by the engagement of its vertical end edges between the said pairs of ribs, a plurality of expansible body members secured to the body plate, and valve heads carried by the body member.

9. A steam trap including a body member constituting an outlet chamber, a pair of substantially U-shaped concentrically arranged partition walls formed integrally with the body member and defining a substantially U-shaped inlet chamber eccentrically disposed with respect to the outlet chamber, the side portions of the inner partition wall being provided with openings communicating with the outlet chamber whereby the steam or water enters the outlet chamber along a radial path, and a multiple thermostatic valve removably mounted in the outlet chamber for successively sealing the said openings in accordance with pre-determined variations in temperature in the outlet chamber.

10. A steam trap including a body casing, a substantially U-shaped partition dividing the casing into a U-shaped inlet chamber and an outlet chamber, there being ports formed in the side portions of the partition, a multiple thermostatic valve arranged in the outlet chamber, said valve including a body plate removably mounted in the casing, a thermally expansible element secured to each face of the plate, each element containing a substance having known ebullitional co-efficient, the ebullitional co-efficient of the substance in one element being different from that of the substance in the other element, and valve heads carried by each element and adapted to close the adjacent port of the U-shaped partition wall in response to pre-determined temperatures in the body casing.

11. A steam trap including a body casing having an inlet chamber and an outlet chamber, diametrically opposed ports effecting communication between the chambers, and a valve member arranged in the outlet chamber, said valve including a pair of independent thermally expansible elements, and a valve head carried by each element, said elements being of different ebullitional co-efficients whereby one of said valve heads will be moved into closed position in advance of the other valve head.

In testimony whereof I affix my signature in presence of two witnesses.

CHARLES B. HOWARD. [L. S.]

Witnesses:
 CLARITA M. PRATT,
 MERTIE A. SMITH.